United States Patent
Anderson et al.

(10) Patent No.: US 12,168,322 B2
(45) Date of Patent: Dec. 17, 2024

(54) TETHERED SPOOL ASSEMBLY AND METHODS OF USE THEREOF

(71) Applicant: Stratasys, Inc., Eden Prairie, MN (US)

(72) Inventors: Patrick Anderson, Maple Grove, MN (US); Dang Yang, Champlin, MN (US); Ross Michalkiewicz, Minneapolis, MN (US)

(73) Assignee: STRATASYS, INC., Eden Prairie, MN (US)

( * ) Notice: Subject to any disclaimer, the term of this patent is extended or adjusted under 35 U.S.C. 154(b) by 340 days.

(21) Appl. No.: 17/859,446

(22) Filed: Jul. 7, 2022

(65) Prior Publication Data

US 2024/0009924 A1    Jan. 11, 2024

(51) Int. Cl.
| | |
|---|---|
| *B29C 64/255* | (2017.01) |
| *B29C 64/321* | (2017.01) |
| *B33Y 30/00* | (2015.01) |
| *B33Y 40/00* | (2020.01) |
| *B65H 57/18* | (2006.01) |
| *B65H 75/18* | (2006.01) |
| *B29K 101/12* | (2006.01) |

(52) U.S. Cl.
CPC .......... *B29C 64/255* (2017.08); *B29C 64/321* (2017.08); *B33Y 30/00* (2014.12); *B33Y 40/00* (2014.12); *B65H 57/18* (2013.01); *B65H 75/182* (2013.01); *B29K 2101/12* (2013.01)

(58) Field of Classification Search
CPC ...... B29C 64/255; B65H 75/182; B65H 57/18
See application file for complete search history.

(56) References Cited

U.S. PATENT DOCUMENTS

| | | | |
|---|---|---|---|
| 5,939,008 | A | 8/1999 | Comb et al. |
| 6,004,124 | A | 12/1999 | Swanson et al. |
| 6,022,207 | A | 2/2000 | Dahlin et al. |
| 6,547,995 | B1 | 4/2003 | Comb |
| 6,722,872 | B1 | 4/2004 | Swanson et al. |
| 7,063,285 | B1 | 6/2006 | Turley et al. |
| 7,127,309 | B2 | 10/2006 | Dunn et al. |
| 7,374,712 | B2 | 5/2008 | Swanson et al. |
| 7,604,470 | B2 | 10/2009 | LaBossiere et al. |

(Continued)

FOREIGN PATENT DOCUMENTS

WO    2016014543 A1    1/2016

OTHER PUBLICATIONS

International Search Report and Written Opinion mailed Feb. 6, 2023 of PCT/US2022/036335 filed Jul. 7, 2022.

(Continued)

*Primary Examiner* — Alison L Hindenlang
*Assistant Examiner* — Keran V Nguyen
(74) *Attorney, Agent, or Firm* — Westman, Champlin & Koehler, P.A.

(57) ABSTRACT

A consumable assembly for a 3D printer includes a spool carrying wound filament. The spool is configured to be installed into a spool cabinet to maintain the filament in a controlled environment. A filament key fob that carries a spool chip programmed with identification data for the consumable assembly is tethered to the spool. The filament key fob is configured to be received in a dock of the 3D printer outside of a controlled environment of a chamber of the spool cabinet while remaining tethered to the spool installed in the chamber of the spool cabinet.

22 Claims, 12 Drawing Sheets

(56) References Cited

U.S. PATENT DOCUMENTS

| | | |
|---|---|---|
| 7,625,200 B2 | 12/2009 | Leavitt |
| 7,938,351 B2 | 5/2011 | Taatjes et al. |
| 8,439,665 B2 | 5/2013 | Batchelder et al. |
| 9,073,263 B2 | 7/2015 | Mannella et al. |
| 9,233,504 B2 | 1/2016 | Douglas et al. |
| 9,327,447 B2 | 5/2016 | Batchelder et al. |
| 10,131,131 B2 | 11/2018 | Batchelder et al. |
| 10,422,179 B2 | 9/2019 | Goldfinch et al. |
| 2010/0096485 A1 | 4/2010 | Taatjes et al. |
| 2010/0096489 A1 | 4/2010 | Taatjes et al. |
| 2010/0283172 A1 | 11/2010 | Swanson |
| 2013/0078073 A1 | 3/2013 | Comb et al. |
| 2013/0161439 A1 | 6/2013 | Beery et al. |
| 2013/0161442 A1 | 6/2013 | Mannella et al. |
| 2014/0178588 A1 | 6/2014 | Swanson et al. |
| 2014/0271967 A1 | 9/2014 | Swanson |
| 2015/0096717 A1 | 4/2015 | Batchelder et al. |
| 2015/0108687 A1 | 4/2015 | Snyder et al. |
| 2020/0282651 A1* | 9/2020 | Chu ................ B33Y 50/02 |
| 2020/0307070 A1 | 10/2020 | Swanson et al. |
| 2021/0046709 A1 | 2/2021 | Barbolini |

OTHER PUBLICATIONS

Non-Final Rejection mailed Aug. 4, 2023 for U.S. Appl. No. 17/859,465, filed Jul. 7, 2022.

Requirement for Restriction/Election mailed Mar. 28, 2023 for U.S. Appl. No. 17/859,465, filed Jul. 7, 2022.

Final Rejection mailed Jan. 4, 2024 for U.S. Appl. No. 17/859,465, filed Jul. 7, 2022.

Non-Final Rejection mailed Jul. 17, 2024 for U.S. Appl. No. 17/859,465, filed Jul. 7, 2022.

* cited by examiner

TETHERED SPOOL ASSEMBLY AND METHODS OF USE THEREOF

BACKGROUND

The present disclosure relates to additive manufacturing systems for 3D printing of parts by material extrusion techniques. In particular, the present disclosure relates to a 3D printer having a spool of consumable filament that has an electronic identification device, sometimes referred to as a spool chip, carried in a filament key fob tethered to the spool and configured to communicate with the printer. All references disclosed herein are incorporated by reference.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, powder bed fusion, binder jetting, direct energy deposition, electrophotographic imaging, and vat photopolymerization (including digital light curing and stereolithographic processes).

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In addition to deposition of thermoplastic resin in fused deposition modeling, a filament supply may also contain chopped particulates or continuous fiber in the form of a filament material. This material may be deposited along with or on top of a deposited thermoplastic resin layer, or deposited as a composite filament consisting of continuous fiber in a core, coated by a thermoplastic resin shell portion. The continuous fiber may also be deposited in an uncoated state, on top of or in conjunction with molten resin. This filament material is fed similarly to that of resin-only filament materials, using a similar filament drive mechanism.

In a system where the material is deposited in generally planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in multiple degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a 3D part in a single build plane, the geometry of part features may be used to determine the orientation of printing.

Whichever print system architecture is used, the printing operation for fused deposition modeling is dependent on extruding build materials from a print head at predictable and targeted extrusion rates, which in turn is dependent upon a reliable method for delivering consumable feedstock materials to the print head. In the case of moisture-sensitive filament materials, the filament is desirably provided to the print head in a dry state (e.g., less than 300 parts-per-million by weight of water) to prevent moisture from negatively affecting the extrusion process. As such, a moisture barrier and/or drying system may be for the filament during transportation, storage, and use in the printer, and desiccant materials may be included in the consumable assembly to assist in drying the filament and maintaining dryness during storage, transportation, and use with the printer. There is an ongoing need for improved methods and apparatus for filament feedstock delivery in 3D printing systems.

SUMMARY

An aspect of the present disclosure includes a consumable assembly for a 3D printer. The consumable assembly includes a spool carrying wound filament, with the spool configured to be installed into a chamber of a spool cabinet to maintain the spool in a controlled environment, such as a heated or humidity-controlled environment. A filament key fob that carries a spool chip programmed with identification data for the consumable assembly is tethered to the spool. The filament key fob is configured to be received in a dock of the 3D printer outside of the chamber and its controlled environment while remaining tethered to the spool installed in the chamber of the spool cabinet. A filament key fob of the consumable assembly carries a spool chip that contains identification data for the consumable assembly and is tethered thereto. The spool chip is configured to be received in a dock of the 3D printer outside of the spool cabinet, and to communicate with the 3D printer while in the dock. A tether of the consumable assembly couples the filament key fob to the spool and continues coupling the filament key fob to the spool when the filament key fob is received in the dock outside of the chamber of the spool cabinet. In another aspect of some embodiments, the tether connects to an axle of the spool.

In another aspect of the present disclosure, the spool chip comprises an E-PROM chip, an RFID tag, or other electronic identification devices. In another aspect, the filament key fob is configured to be received in the dock of the 3D printer to position the identification device adjacent a corresponding spool chip interface of the 3D printer.

In another aspect of the present disclosure, the filament key fob is retained in a housing configured to attach and detach from the spool. In another aspect, the housing is configured to function as a handle for carrying the spool when attached to the spool and is configured to be received in the dock of the 3D printer when detached from the spool. The handle allows the consumable assembly to be carried by an operator for installation and removal of the spool in spool cabinet of the 3D printer, while residing outside of the heated environment of the spool cabinet to remain cool to the touch while the spool is installed in the spool cabinet.

In another aspect the handle formed by the filament key fob housing is configured to be removably attached to edges of two spaced apart spool walls. The handle can include first and second snap fit channels configured to snap-fit to the edges of the spaced apart spool walls. The handle can also include a latch release mechanism configured to be manipulated to cause the handle to release from the edges of the spaced apart spool walls. In another aspect, the latch release mechanism of the handle is also configured to function as a release mechanism for securing the handle in the dock and releasing the handle from the dock.

Another aspect of the present disclosure includes a method of handling a fused deposition modeling filament spool on which filament is wound. The method includes loading the spool, with a filament key fob or other electronic spool identification component coupled to the spool by a tether, into a 3D printer. The filament key fob comprises a housing, which in some embodiments is configured to attach and detach from the spool as a handle (separately from the tether). The spool is positioned in a chamber of a spool cabinet of the 3D printer, the chamber providing a controlled environment for the filament wound on the spool. In embodiments in which the filament key fob is attached or secured to the spool separately from the tether, the housing is detached from the spool with the housing still coupled to the spool by the tether, and positioned in a dock of the 3D printer. In embodiments in which the filament key fob is not separately attached to the spool, the filament key fob is still positioned in the dock of the 3D printer. The dock is located outside of the chamber of the spool cabinet, to preserve the spool chip while allowing the 3D printer to utilize the filament wound on the spool.

In another aspect of the disclosure, the filament key fob is configured to be received in the dock of the 3D printer to position the spool chip adjacent a corresponding spool chip interface of the 3D printer.

In another aspect of the disclosure, the chamber of the spool cabinet provides a heated environment for the filament wound on the spool, and positioning the filament key fob in the dock located outside of the chamber maintains the spool chip at a temperature lower than the temperature of the heated environment. In another aspect of some embodiments, the method includes closing a door of the spool cabinet and heating the spool and filament to a temperature above 50 degrees C., while maintaining the spool chip at a temperature below 50 degrees C.

In another aspect of the disclosure, the spool chip is contained in a housing configured to function as a handle when attached to the spool, and wherein positioning the spool in the chamber of the spool cabinet of the 3D printer includes positioning the spool using the handle, and positioning the spool chip housing in the dock of the 3D printer includes positioning the handle in the dock of the 3D printer. In another aspect, removing the spool chip and spool chip housing from the spool with the spool chip housing still coupled to the spool by the tether further comprises removing the handle from the spaced apart spool walls while the spool is positioned in the chamber and while the handle remains coupled to the spool by the tether. In another aspect, transporting the spool includes carrying the spool by the handle.

In another aspect of the disclosure, the method includes removing the handle from the dock, securing the handle to the spool; and using the handle to remove the spool from the chamber of the spool cabinet. In another aspect, securing the handle to the spool further comprises securing the handle to spaced apart spool walls of the spool, proximate one of a plurality of notches in the spool walls, such that the notches and handle secure an end portion of the filament to a spool wall.

In another aspect of the disclosure, the handle includes first and second snap fit channels configured to snap-fit to the edges of the spaced apart spool walls, and the handle further includes a latch release mechanism configured to be manipulated to cause the handle to release from the edges of the spaced apart spool walls. In the method, removing the handle from the dock further can further comprise using the latch release mechanism to release the handle from the dock.

DETAILED DESCRIPTION

Figure 1:
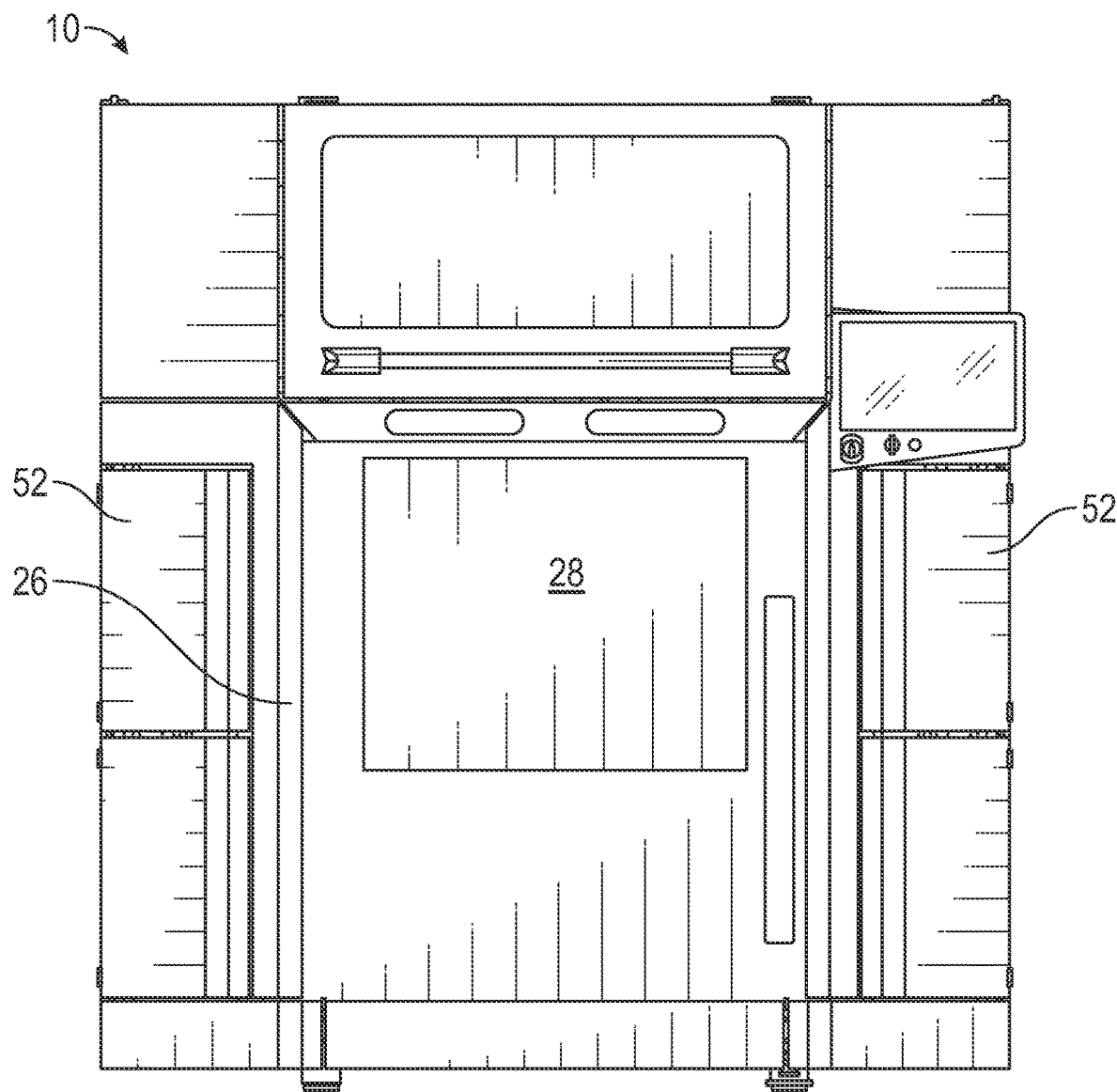
FIG. 1 is a front view of a 3D printer configured to print 3D parts and support structures with the use of one or more consumable assemblies of the present disclosure.

The present disclosure relates to consumable assemblies for use with a 3D printer, for example where a consumable assembly includes a spool configured to retain a supply of consumable filament material and a data tag that includes information about the filament. The consumable assembly includes a spool chip or electronic spool identification component tethered to the spool, for example, an E-PROM chip or an RFID tag retained within a housing. The spool chip of the consumable assembly contains identification data and/or other data for the consumable assembly. The spool is configured to be installed into a spool cabinet of a 3D printer, and the housing of the filament data key or filament key fob is configured to be received in a dock of the 3D printer outside of the spool cabinet and to communicate with the 3D printer while in the dock. Typically, the spool cabinet has a controlled (e.g., heated and/or dehumidified) environment within the printer, and the spool chip is sensitive to heat. A tether of the consumable assembly couples the filament data key to the spool and continues to couple that device to the spool when the spool chip is received in the dock outside of the spool cabinet. The geometry of the filament key fob retains it in the dock.

In some embodiments, the housing of the filament data key is configured to be separately attached to the spool before and/or after use. In these embodiments, the spool chip housing is removable from the spool after installation of the spool in a chamber of a spool cabinet, but remains coupled to the spool by the tether. After installation of the spool in the cabinet the spool chip is inserted into a dock of the 3D printer, located outside of the chamber to maintain the spool chip outside of a controlled (e.g., heated) environment within the chamber.

In some embodiments, the spool chip is retained in a housing that attaches and detaches from the spool, while remaining separately connected to the spool via the tether. Attaching the spool chip housing to the spool reduces opportunities for tangling of the tether and catching of the device during installation and unloading of the spool. The housing may be configured to additionally function as a handle for the spool. For example, a spool chip housing configured to be attached to the sidewalls or flanges of the spool to provide a surface for gripping and maneuvering the spool into a location in or proximate the 3D printer, and to be detached from the spool once the spool is installed in the 3D printer allowing the spool to rotate to dispense filament to print a 3D part or associated support material. The spool chip housing, configured to function as a handle, can be reattached to the spool after use, so that the hot-to-the-touch spool can be removed from the machine with a cool-to-the-touch handle.

The spool chip can include and communicate information to the printer about the type of material, the diameter of the filament and/or the remaining length of the filament on the spool, by way of non-limiting example, such as is described in Stratasys U.S. Pat. No. 6,022,207 and MakerBot U.S. Pat. No. 9,233,504, the contents of which are incorporated by reference in their entireties. The spool chip be any electronically readable device, such as an electronically readable and writeable circuit board or EPROM device. The spool chip can be configured to store and update data, specifications and other information about the filament wound on the spool. The spool chip acts as a data tag and may include a variety of functions. For example, characteristic data stored on the spool chip may include at least one of a material identification number, a build material type, a build material diameter, an extruder temperature requirement, a build material melting temperature, a build material color, a build material color lot number, a cost per unit of build material, a build material density, a build material tensile strength, a build material viscosity, a build material recycle code, a build material expiration date, or other characteristic information appropriate for a three-dimensional printer. The spool chip may also be used for tracking the lineal feet of filament on the spool. The data can include nonexecuting code that includes information such as the length of filament remaining on the spool, the type of material, the average outer diameter of the filament, the batch number, the number of times the spool has been loaded into a 3D printer, the storage conditions necessary for holding the filament spool in the cabinet, etc. The 3D printer may interrogate the spool chip to verify the spool material information and OEM confirmation, keep track of the length or volume of material withdrawn from the spool during printing, or verify or monitor other data related to the material on the spool. As filament is advanced to the extruder, the printer keeps track of how much material was wound off the spool or commanded to be extruded, and subtracts this amount from the total on the device. The 3D printer can then write back to the spool chip to update the stored information. In another aspect, the spool chip may encode a unique identifier for the consumable assembly, which can be used by the printer, e.g., in combination with a remote network resource, to determine properties of the build material from which to further determine operational parameters for a fabrication process using the build material. The material type information may be used by the printer to configure machine parameters suitable for fabricating parts from that particular material.

A variety of types of consumable assemblies can be used in embodiments of the present invention for supplying spooled filament. Terms used herein to describe containers for consumable filament material include a spool, a container, a canister, a cartridge, and so forth. Unless a different meaning is explicitly provided or otherwise clear from the context, all such terms are intended to refer generally to a container or the like that holds and wound filament material and provides such material to a 3D printer as a consumable printing material.

Consumables for 3D printing have previously included electronic devices (sometimes referred to as "spool chips" or "spool tags") to maintain and provide filament data for 3D printers in a variety of ways. The spool chip may be any device or combination of devices suitable for storing data relating to the filament material. This may, for example, include a radio frequency identification (RFID) tag such as an active or passive RFID tag, an optically-identifiable tag such as a bar code, quick read (QR) code, or the like, a magnetically-identifiable tag such as a magnetic swipe strip, or any other tag that can be automatically detected and correlated by the controller to identify information for the material on the spool. A sensor that reads data from the spool chip may automatically identify the filament material and provide data concerning the type of build material and the like to a controller. The spool may be contained within a consumable assembly, and a spool chip mounted to the consumable assembly, such as disclosed in U.S. Pat. No. 7,063,285. The spool may be assembled in a consumable assembly and further packaged with an associated print head that includes a spool chip, such as disclosed in U.S. Pat. No. 9,073,263. Once the consumable is installed in the printer, the spool may be automatically read by a sensor or reader on the 3D printer. In other previous consumable assemblies, the spool of filament is provided along with a separate component containing the spool chip, and through which the filament is initially fed, as is disclosed in U.S. Pat. No. 7,938,351. A user feeds the filament through the component, then arranges the spool and component into a material container, and loads the material container into the 3D printer for operation. As the components containing the spool chip may all look alike, and as different filament materials may have different use specifications that are stored on the spool chip, loss of an unattached chip component or accidental mismatching of a chip component with a material on a spool can cause part errors and/or inoperability of the consumable assembly. The present invention prevents this potential problem by connecting the spool and the removable spool chip, optionally forming a handle from the spool chip housing, together with a tether.

While exemplary embodiments are described with reference to a tethered spool chip housing or filament key fob which can also function as a handle, it is not required that the spool chip housing also function as a handle or that the spool chip housing be attachable or securable to the spool separately from the tethered connection. Further, in some embodiments, a handle is tethered to the spool, but it is not required that the handle contain a spool chip.

The filament material may, for example, include acrylonitrile butadiene styrene ("ABS"), polycarbonate, nylon, composite materials, filled materials, support materials, or any other suitable plastic, thermoplastic, or other material that can usefully be extruded to print an object. In some embodiments, the environment in which the spool and filament is retained is at an elevated temperature which can damage or destroy spool chips such as memory chips. For example, the type of material contained on a spool may consist of high temperature thermoplastic resin materials such as Nylon 12, PC, ASA and Ultem 9085, PES, PPSU, PEKK and PEI; continuous carbon fiber; or core/shell combinations of both fiber and resin. These materials may be held at temperatures above 100 C in order to ensure that the filament does not absorb moisture, either during storage or during printing. As the spool chip is retained within a spool chip housing, optionally configured as a handle removable from the spool in disclosed embodiments, the removed housing or handle can be retained at a location outside of an optionally heated environment to protect the chip while allowing the information to be read and used by the 3D printer. However, the handle need not include a spool chip or other electronic device in all embodiments, and conversely in embodiments including a spool chip the spool chip housing does not need to form a handle in all embodiments. In embodiments with a tethered handle, regardless of whether the handle includes a spool chip, storing the handle in a position outside of the heated environment allows an operator to retrieve the handle, kept at ambient conditions or at "touch-safe" temperatures lower than 60 C, and use it to remove the heated spool without waiting for the spool to cool to a temperature which can be tolerated by the operator's hand. If the spool cabinet 52 is not held at an elevated temperature, the handle would still provide a convenient and beneficial method for removing the spool after use, since material spools are often quite heavy, and the spool can be recessed into the spool bay in a fashion which makes it difficult to retrieve, especially when hot. The spool chip and housing are also referred to here as a filament key fob.

The handle or filament key fob is configured to be snap and release, for example attached to the two side wall outer perimeter edges of the spool, also known as flanges, as a convenient way to pick up the spool. As the handle is gripped, the spool is stationary relative to the handle which allows the spool to be loaded into a bay in the 3D printer or positioned proximate the 3D printer. Once the spool is loaded into the bay, the handle is removed to allow the spool to rotate about an axle to dispense filament. In embodiments including a spool chip in the handle, the handle is then loaded into a receptacle or port, outside of any heated environment in the bay, that is configured to read the information on the memory and send a signal to a controller to provide information contained in the memory. In some embodiments, if the handle is not positioned in the port, the 3D printer will not recognize that the spool has been loaded and will not allow the 3D printer to utilize the spool in a print operation. In other embodiments, the 3D printer will recognize the spool chip even if not positioned in the port, such RFID chips using near field communication.

Figure 2:
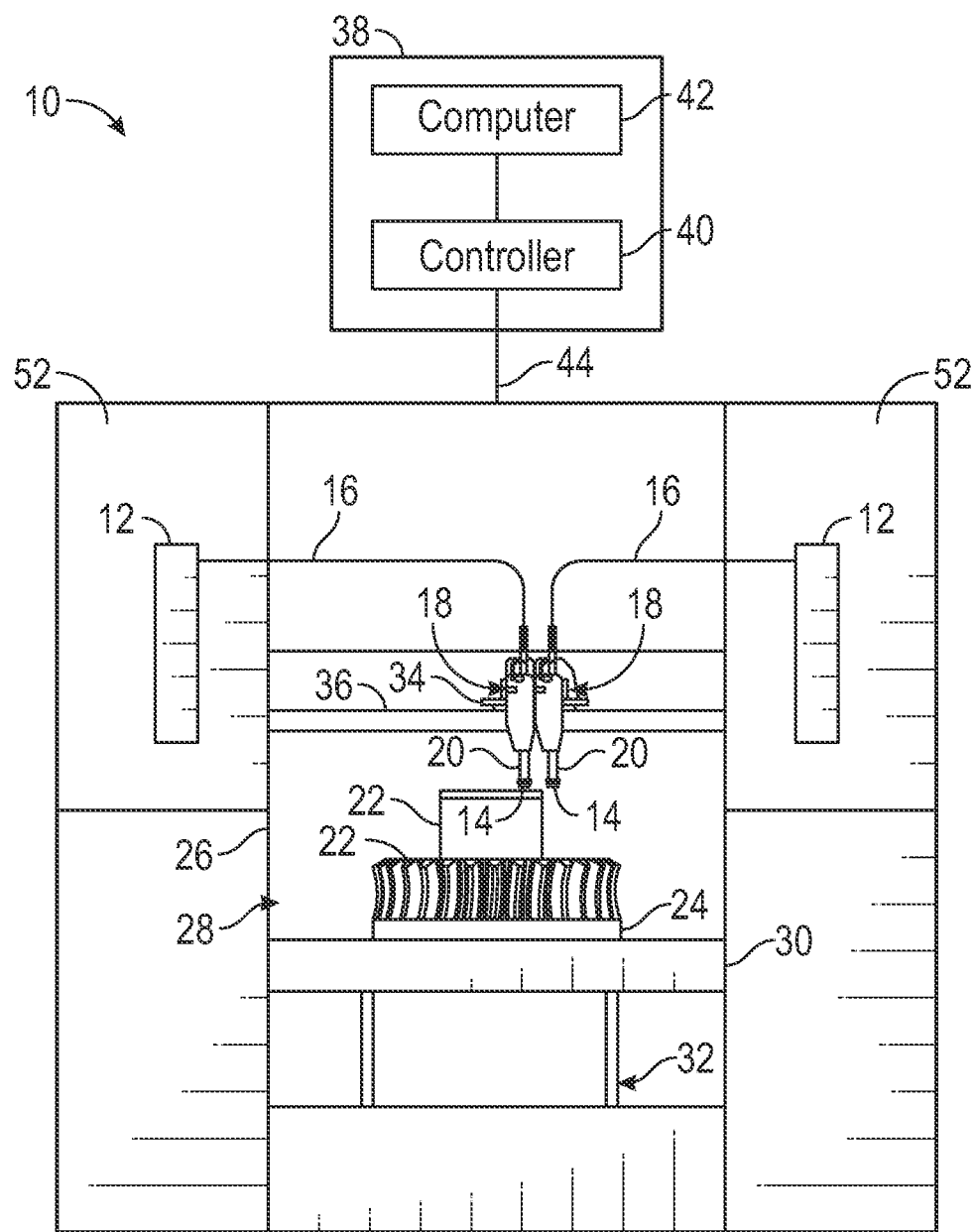
FIG. 2 is a front diagrammatic view of a 3D printer shown in FIG. 1.

The present disclosure may be used with any suitable extrusion-based 3D printer. For example, FIGS. 1 and 2 illustrate front and front schematic views of a 3D printer 10 that has a substantially horizontal print plane where the part being printed is indexed in a substantially vertical direction as the part is printed in a layer-by-layer manner using two print heads 18. The illustrated 3D printer 10 uses one or more consumable assemblies 12, where each consumable assembly 12 is an easily loadable, removable, and replaceable spool that retains a supply of a consumable filament for printing with 3D printer 10. Typically, one of the consumable assemblies 12 contains a part material filament, and the other consumable assembly 12 contains a support material filament, each supplying material to one of the print heads 18. However, both consumable assemblies 12 may be identical in structure.

Each print head 18 is an easily loadable, removable and replaceable device comprising a housing that retains a liquefier assembly 20 having a nozzle tip 14. Each print head 18 is configured to receive a consumable material, melt the material in liquefier assembly 20 to produce a molten material, and deposit the molten material from a nozzle tip 14 of liquefier assembly 20. Examples of suitable liquefier assemblies for print heads 18 include those disclosed in Swanson et al., U.S. Pat. No. 6,004,124; LaBossiere, et al., U.S. Pat. No. 7,604,470; Leavitt, U.S. Pat. No. 7,625,200; and Batchelder et al., U.S. Pat. No. 8,439,665. Other suitable liquefier assemblies include those disclosed in U.S. Pat. Nos. 9,327,447 and 10,131,131; and in PCT publication No. WO2016014543A.

Guide tubes 16 interconnect consumable assemblies 12 and print heads 18, where a drive mechanism of print head 18 (or of 3D printer 10) draws successive segments of the consumable filament from consumable assembly 12, through guide tube 16, to liquefier assembly 20 of print head 18. In this embodiment, guide tube 16 may be a component of 3D printer 10, rather than a sub-component of consumable assemblies 12. In other embodiments, guide tube 16 is a sub-component of consumable assembly 12, and may be interchanged to and from 3D printer 10 with each consumable assembly 12. During a build operation, the successive segments of consumable filament that are driven into print head 18 are heated and melt in liquefier assembly 20. The melted material is extruded through nozzle tip 14 in a layerwise pattern to produce printed parts.

3D printer 10 prints 3D parts or models and corresponding support structures (e.g., 3D part 22 and support structure 24) from the part and support material filaments, respectively, of consumable assemblies 12, using a layer-based, additive manufacturing technique. Exemplary 3D printer 10 prints parts or models and corresponding support structures from filament supplied by consumable assemblies 12 by extruding roads of molten material along toolpaths. During a build operation, successive segments of consumable filament are driven into an appropriate print head with a filament drive, where they are heated and melted in a print head liquefier. The melted material is extruded through a print head nozzle tip in a layer-wise pattern to produce printed parts. In some embodiments, the print heads move in a plane and a build platen is moved along a print axis to print the part and support structure. In other embodiments, three-dimensional tool paths can be utilized. In some embodiments, a robotic that moves in five or more degrees of freedom to print the part. Typically, the printer will print both part material and support material, and each of consumable assemblies will respectively supply either part material filament or support material filament to a print head designed to print either part material or support material. Suitable 3D printers for 3D printer 10 include extrusion-based systems developed by Stratasys, Inc., Eden Prairie, MN under the trademark "FDM".

As shown, 3D printer 10 includes system casing 26, chamber 28, platen 30, platen gantry 32, head carriage 34, and head gantry 36. System casing 26 is a structural component of 3D printer 10 and may include multiple structural sub-components such as support frames, housing walls, and the like. In some embodiments, system casing 26 may include spool cabinets 52 configured to receive consumable assemblies 12. The consumable assemblies are loaded into container bays or spool cabinets 52 where the spools and filament may be preheated and/or dried. While two particular spool cabinets are called out in FIGS. 1 and 2, disclosed embodiments are not limited to any specific number of spool cabinets or positions of the spool cabinets. Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive and retain one or both print heads 18, and is supported by head gantry 36. Head carriage 34 preferably retains each print head 18 in a manner that prevents or restricts movement of the print head 18 relative to head carriage 34 so that nozzle tip 14 remains in the x-y build plane, but allows nozzle tip 14 of the print head 18 to be controllably moved out of the x-y build plane through movement of at least a portion of the head carriage 34 relative the x-y build plane (e.g., served, toggled, or otherwise switched in a pivoting manner).

In the shown embodiment, head gantry 36 is a robotic mechanism configured to move head carriage 34 (and the retained print heads 18) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Publication No. 2013/0078073, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), capstans, pulleys, belts, screws, robotic arms, and the like.

In an alternative embodiment, platen 30 may be configured to move in the horizontal x-y plane within chamber 28, and head carriage 34 (and print heads 18) may be configured to move along the z-axis. Other similar arrangements may also be used such that one or both of platen 30 and print heads 18 are moveable relative to each other. Platen 30 and head carriage 34 (and print heads 18) may also be oriented along different axes. For example, platen 30 may be oriented vertically and print heads 18 may print 3D part 22 and support structure 24 along the x-axis or the y-axis.

System 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to 3D printer 10.

Controller assembly 38 may communicate over communication line 44 with print heads 18, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen 30 to a predetermined height within chamber 28. Controller assembly 38 may then direct head gantry 36 to move head carriage 34 (and the retained print heads 18) around in the horizontal x-y plane above chamber 28. Controller assembly 38 may also direct print heads 18 to selectively draw successive segments of the consumable filaments from consumable assemblies 12 and through guide tubes 16, respectively.

While FIG. 1 illustrates a 3D printer 10 where a build plane is in a substantially horizontal x-y plane and the platen 30 is moved in a z direction substantially normal to the substantially horizontal x-y build plane, the present disclosure is not limited to a 3D printer 10 as illustrated in FIG. 1. Rather, the consumable assemblies of present disclosure can be utilized with any 3D printer, including, but not limited to, printing in a substantially vertical print plane and moving the platen in a direction substantially normal to the substantially vertical print plane. Whatever 3D printer is utilized, embodiments of the disclosed consumable assemblies may be used in a filament-based 3D printing system.

Figure 3:
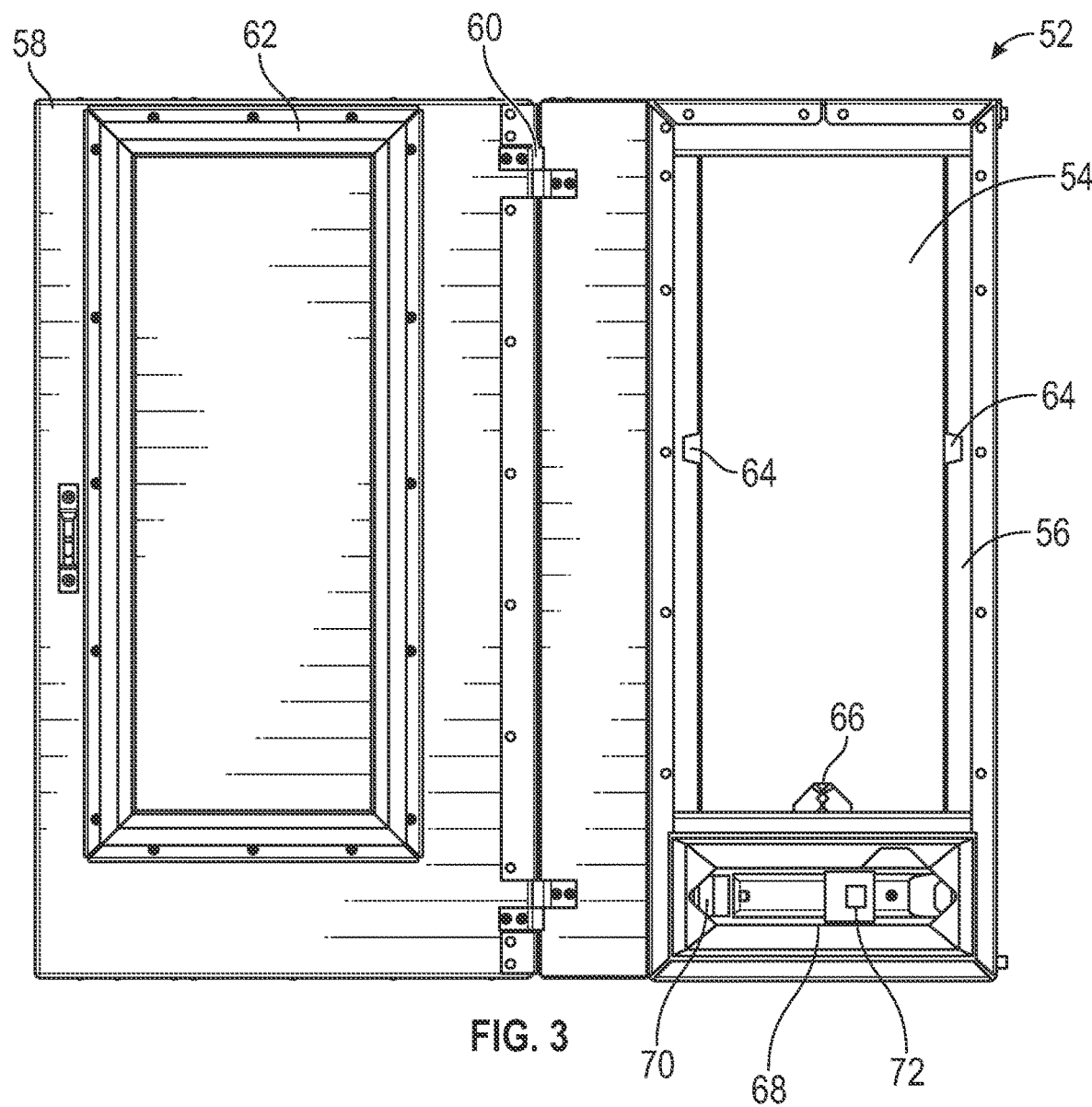
FIG. 3 is a front view of a spool cabinet of the 3D printer shown in FIG. 1.

Referring now to FIG. 3, shown is a single spool cabinet 52, warming or drying being optional, from system casing 26. Spool cabinet 52 includes a chamber 54 formed within a cabinet frame 56, and a cabinet door 58 coupled to the cabinet frame 56 by hinges 60 such that the door can be opened and closed to allow access for insertion or removal of consumable assemblies 12. As chamber 54 can be heated in order to preheat a consumable assembly to aid in the 3D printing process, door 58 includes a gasket 62 configured to seal against cabinet frame 56 to aid in containing the heat energy within the chamber. The spool cabinet keeps filament dry; some filament types absorb moisture from the air resulting in unacceptable printing quality. Spool cabinet 52 can also include axle channels 64 which are configured to receive an axle of a consumable assembly spool when positioned within the chamber 54. Other consumable assembly mounting mechanisms can be included in addition to, or instead of, axle channels 64. Further, in some embodiments, spool cabinet 52 also includes a filament guide receptacle 66 into which a filament guide (shown in FIGS. 9-10) can be inserted to aid in guiding filament from the spool into the drive of the 3D printer. The filament guide can be included with the consumable assembly in some embodiments.

In some exemplary embodiments, spool cabinet 52 also includes a dock 68 configured to receive a filament key fob that houses a spool chip or spool identification component. The dock 68 can include a notch 74 configured to allow routing of a tether 206 from the spool chip housing. The filament key fob can be inserted into dock 68, where a latch receiving structure 70 interacts with corresponding components of the device as discussed with reference to FIGS. 4-7. Dock 68 can also include an electronic spool chip interface 72, such as a memory chip interface, configured to read data from, write data to, or otherwise interact with the spool chip of the filament key fob. Dock 68 is positioned outside of the heated chamber 54 such that, with door 58 closed to form a seal between the gasket 62 and cabinet frame 56, a device positioned in dock 68 will remain at a lower temperature relative to the temperature of chamber 54 when heated, even though it is coupled to the spool axel via a tether 206. This allows the filament key fob to remain at a temperature which can be touched by an operator and also protects any electronic device from being damaged by the high temperatures within chamber 54. For example, some chip designs cannot be exposed to temperatures above 60° C., but a typical spool cabinet temperature for warming filament is far in excess of this temperature. In some embodiments dock 68 is positioned such that the dock and electronic device are covered by door 58 when closed to heat chamber 54. However, in other embodiments, dock 68 can be positioned elsewhere and not covered by door 58 if the printing operation is conducted at temperatures below 60° C. The present disclosure encompasses one or more spool cabinets and one or more consumable assemblies.

Figure 4:
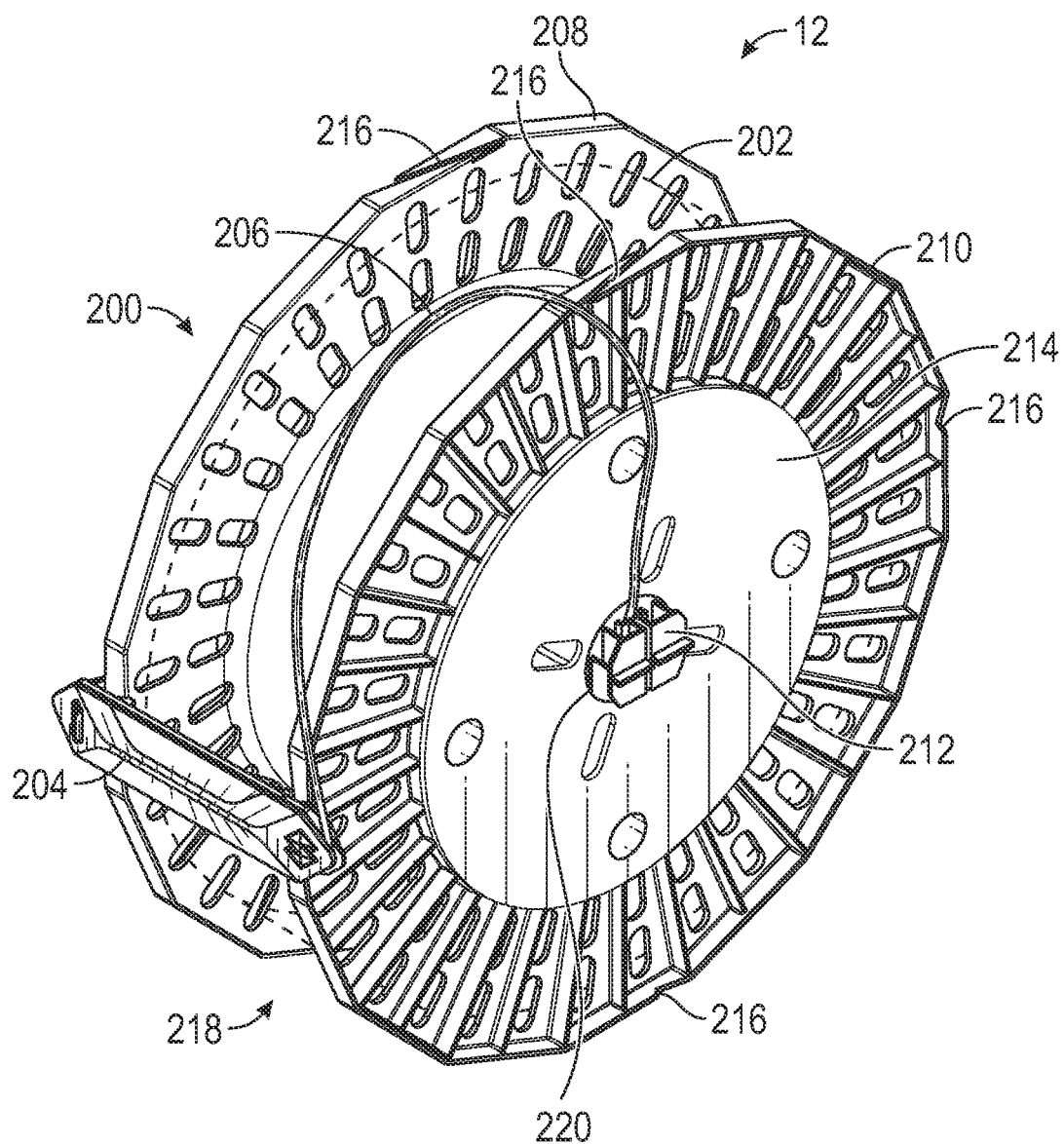
FIG. 4 is a perspective view of an embodiment of a consumable assembly of the present disclosure.
Figure 4A:
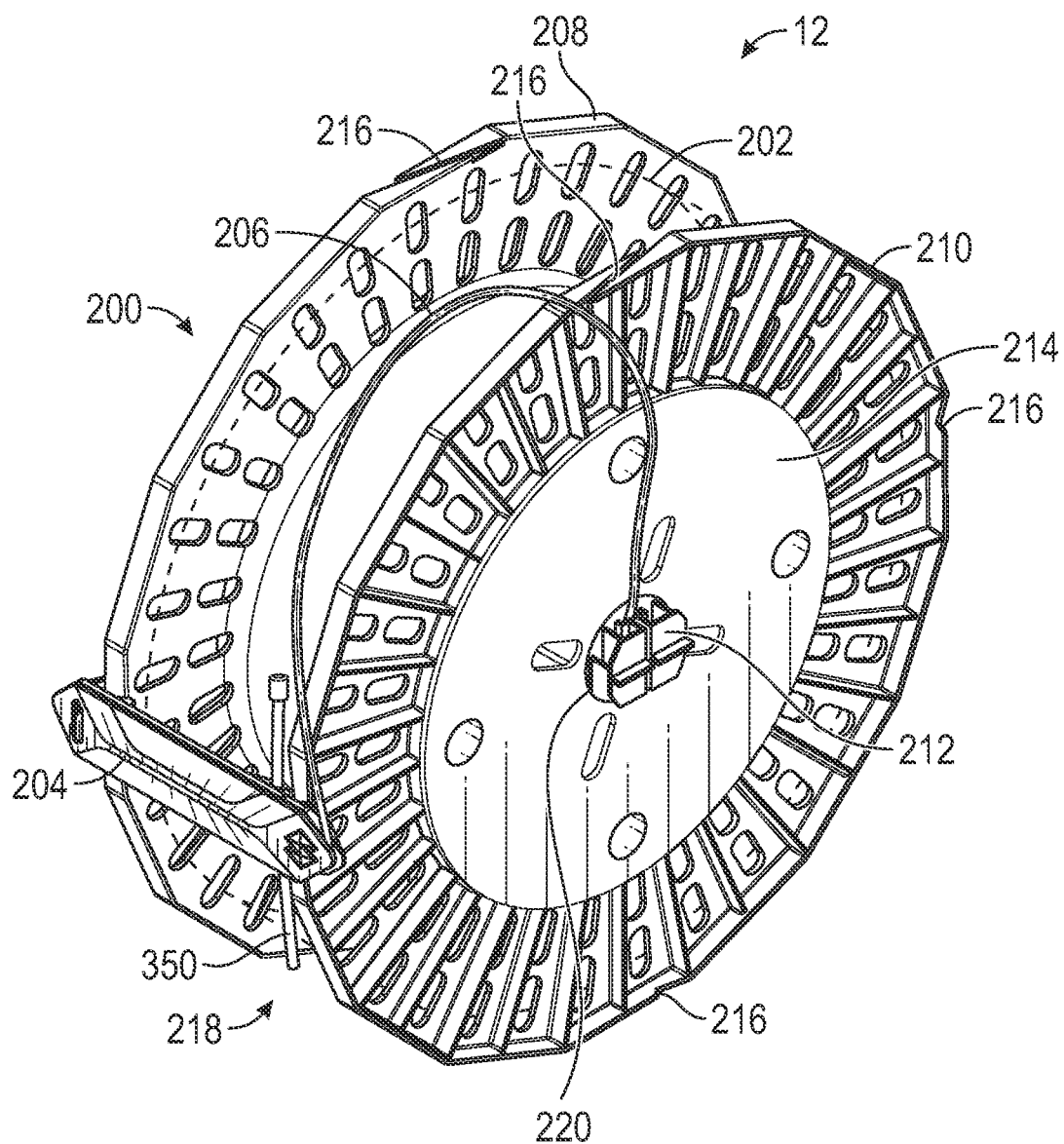
FIG. 4A is a perspective view of the consumable assembly as shown in FIG. 4, with a filament guide snapped into a filament key fob in accordance with some embodiments.

Referring now to FIGS. 4 and 4A, shown is an exemplary embodiment of a consumable assembly 12 having a spool 200, on which consumable filament 202 is wound, and a filament key fob 204 comprising a spool chip 306 retained in a housing, and connected to the spool by a tether 206. Tether 206 couples the filament key fob 204 to the spool, and is separate from any devices providing a filament path between the spool and the printer. Filament key fob 204, configured as a removable handle for spool 200 in the shown embodiment, is provided as an example of a spool chip including structure. While an exemplary embodiment is described with reference to filament key fob 204 being a handle, device 204 can alternatively be any spool chip or electronic device retained in a housing which does not function as a handle. Also included in the embodiment shown in FIG. 4A is a filament guide 350, which may attach to the spool 200 via a snap fit with the housing of the filament key fob 204.

Spool 200 includes a pair of spaced apart spool walls or flanges 208 and 210, a hub 214, a central passage 220 extending longitudinally through the hub, and an axle 212 retained within the central passage of the hub. In an exemplary embodiment, consumable assembly 12 can include self-aligning features which prevent the spool from being installed backwards or in another mis-aligned fashion. As an example, consumable assembly 12 can include features which only allow axle 212 to be put into the central passage 220 of the hub 214 in one direction. In order to prevent insertion of the axle into spool incorrectly, the geometry of the central passage 220 and axle 212 can be such that an attempt to insert the axle into the central passage from spool wall 210 will be unsuccessful. An example of such geometry and features is disclosed in Koop et al., U.S. Pat. No. 10,422,179. A filament winding area 218 is defined by the spool walls and the hub to store the wound filament 202. Tether 206 is connected between the axle 212 and the housing of the filament key fob 204 so that the two can remain tethered together as the spool walls and hub rotate about the axle with the handle positioned in dock 68. The tether 206 is thin enough that the gasket 62 of the door seals against the tether and frame when the spool cabinet 52 door is closed. In some embodiments, flanges 208 and 210 include notches 216 configured to receive an end piece of the filament 202 to prevent the filament from unraveling when being stored or transported.

Figure 5:
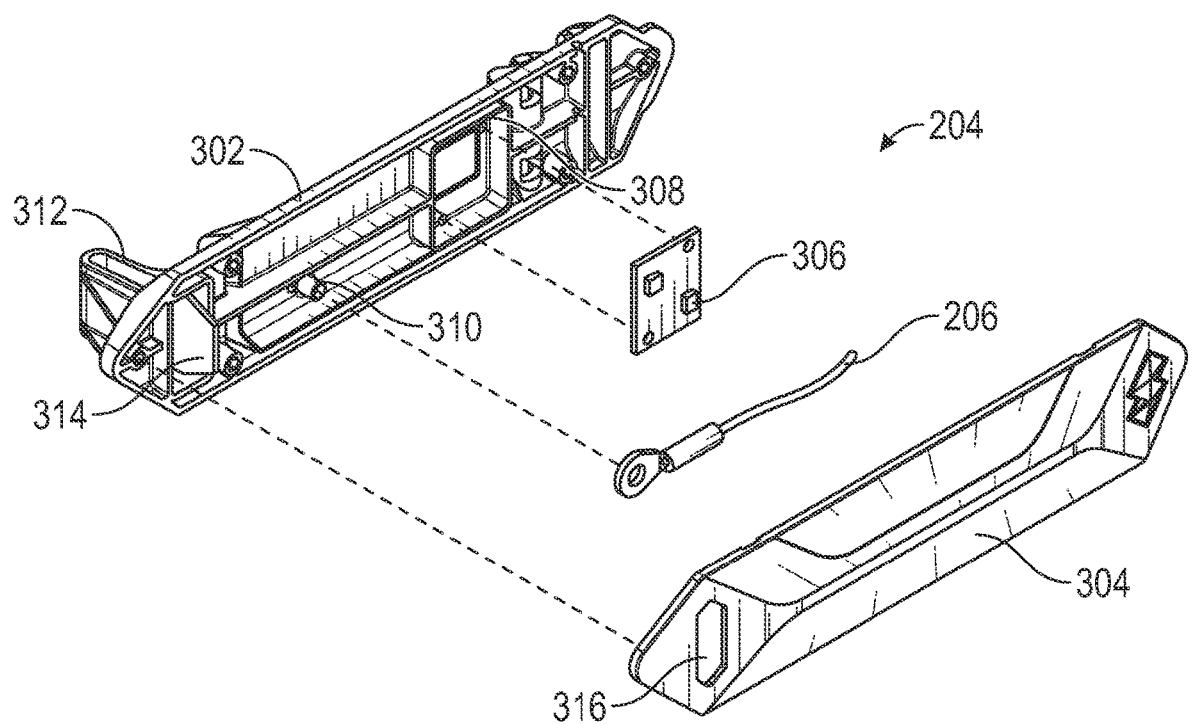
FIGS. 5-7 are exploded and perspective views of a removable filament key fob of the consumable assembly shown in FIG. 4, optionally in the form of a handle.
Figure 6:
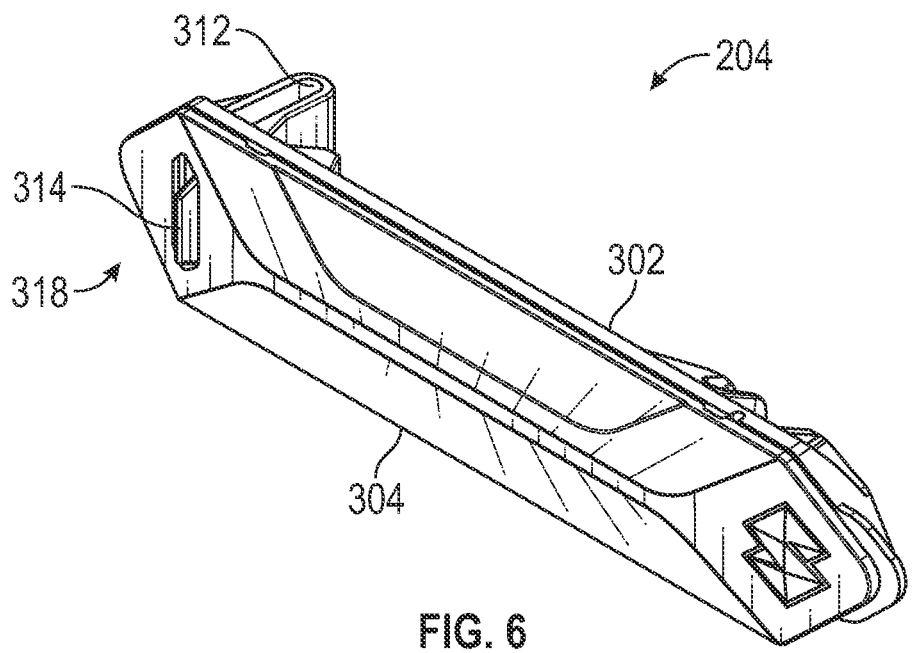

The exemplary filament key fob 204 is configured for dual use as a handle for use by an operator of a 3D printer to carry the spool 200 to or from the 3D printer, and to load and unload the spool from the spool cabinet 52. FIGS. 5-7A further illustrate filament key fob 204 in an exemplary embodiment. As best seen in the exploded perspective view of FIG. 5, filament key fob 204 comprises a housing which in the shown embodiment includes first and second housing pieces 302 and 304, and which can be molded plastic pieces in an exemplary embodiment. The spool chip 306, an electronic device such as a memory chip, is located in a receptacle 308 of first piece 302, with the receptacle 308 positioned to be adjacent electronic device interface 72 of dock 68 when the handle is inserted into the dock. A tether attachment mechanism 310 is also included in one or both of first and second pieces 302 and 304, with tether 206 attached to mechanism 310. For illustrative purposes, only a portion of tether 206 is illustrated in FIG. 5. However, tether 206 must be of sufficient length to allow filament key fob 204 to be inserted into dock 68 while maintaining attachment to axle 212 while inside the spool cabinet.

Figure 7:
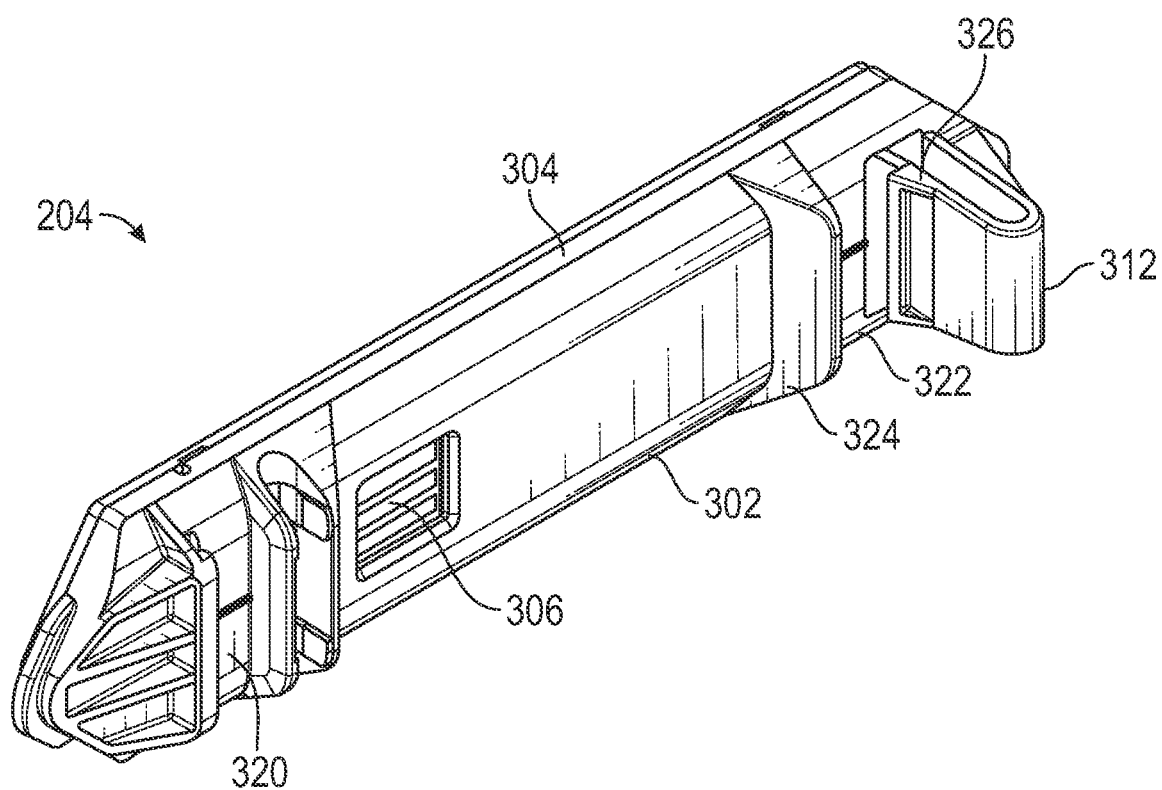
Figure 7A:
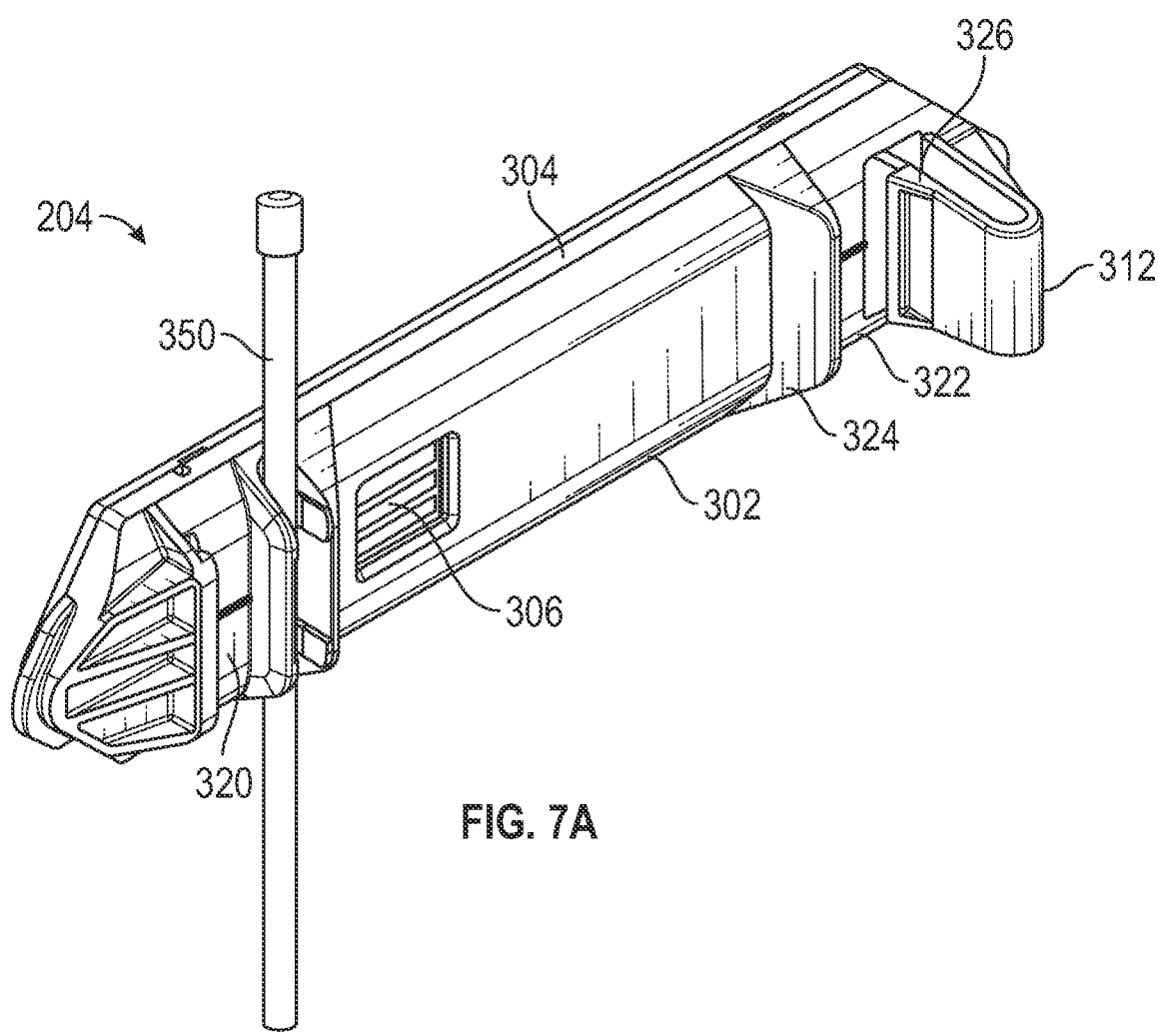
FIG. 7A is a perspective view of the filament key fob as shown in FIG. 7, with a filament guide snapped into the filament key fob.

The filament key fob 204 of the shown embodiment is configured as a snap fit style handle configured to be snap fit onto the outer perimeter edge of the spool walls 208 and 210 of spool 200, or onto structures within dock 68. First and second snap fit channels 320 and 322 of filament key fob 204 are best shown in FIGS. 7 and 7A. Channel 322 is formed between a latch insertion member 312, having a rear tab 314, and a second channel member 324. Latch insertion member 312 includes a tab 326 which locks filament key fob 204 in place after insertion of member 312 into latch receiving structure 70 of dock 68, or after an outer perimeter portion of spool wall 208 is received into the channel 322. Rear tab 314 extends through tab receiving aperture 316 of second handle piece 304 to provide a latch release mechanism 318. Deflection of tab 314, for example by the operator's thumb, moves tab 326 to allow release from the receiving structure 70 of dock 68, or release of the spool wall 208 from the channel 322. FIG. 7A illustrates the optional feature of filament guide 350 snap fitting into the housing of filament key fob 204.

Figure 8:
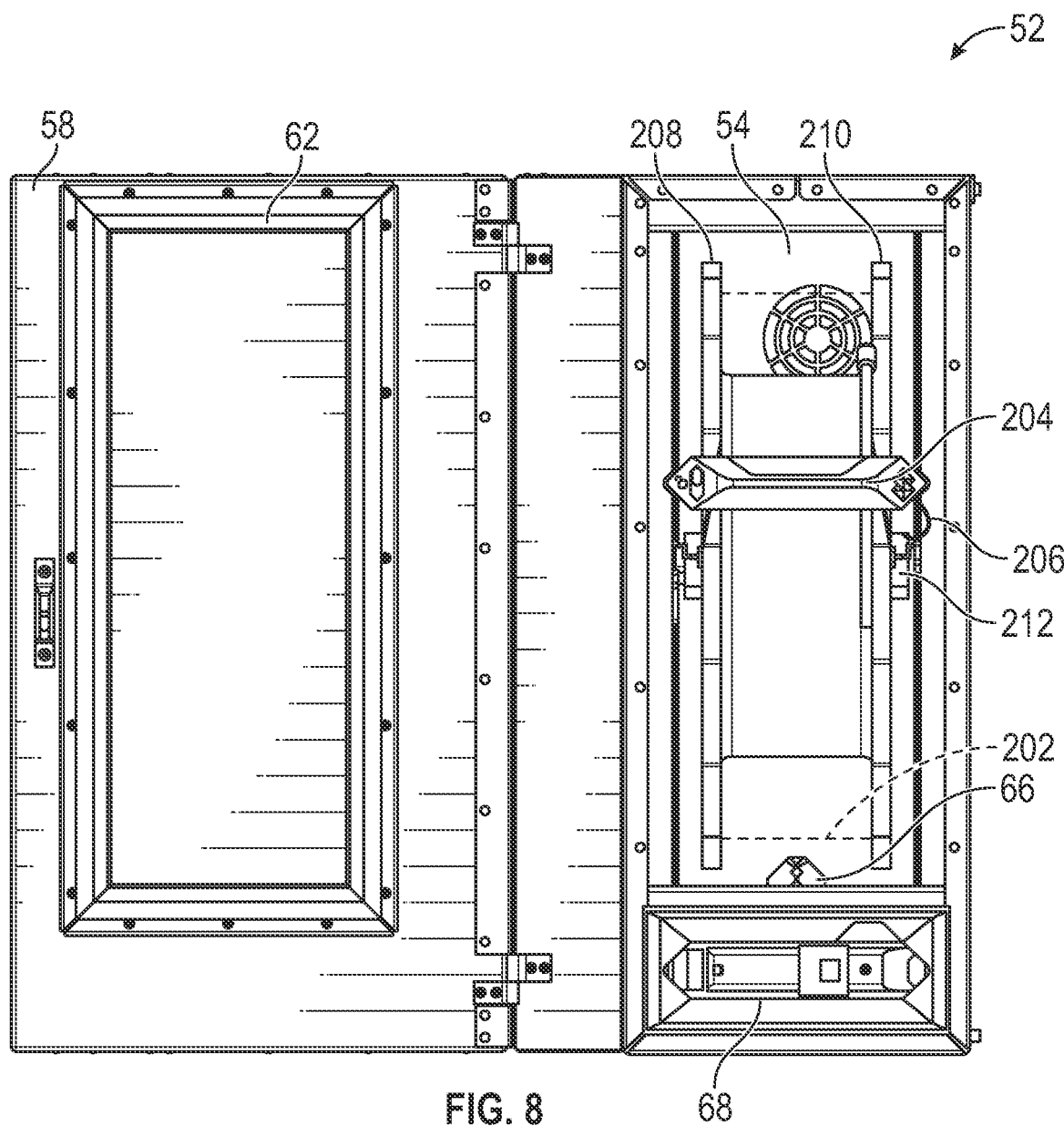
FIGS. 8-10 are views of the spool cabinet of FIG. 3, illustrating a process for installing a consumable assembly.
Figure 9:
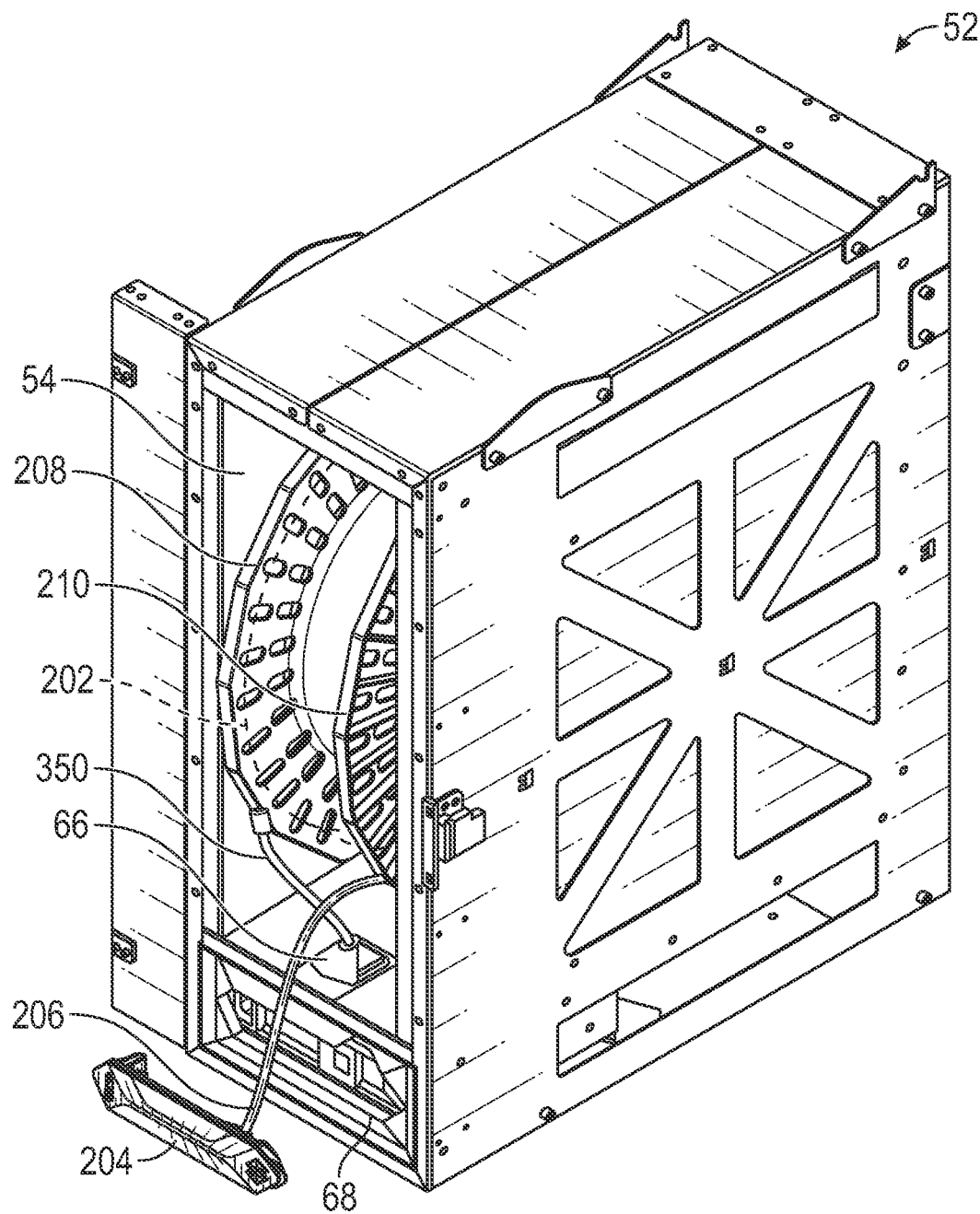
Figure 10:
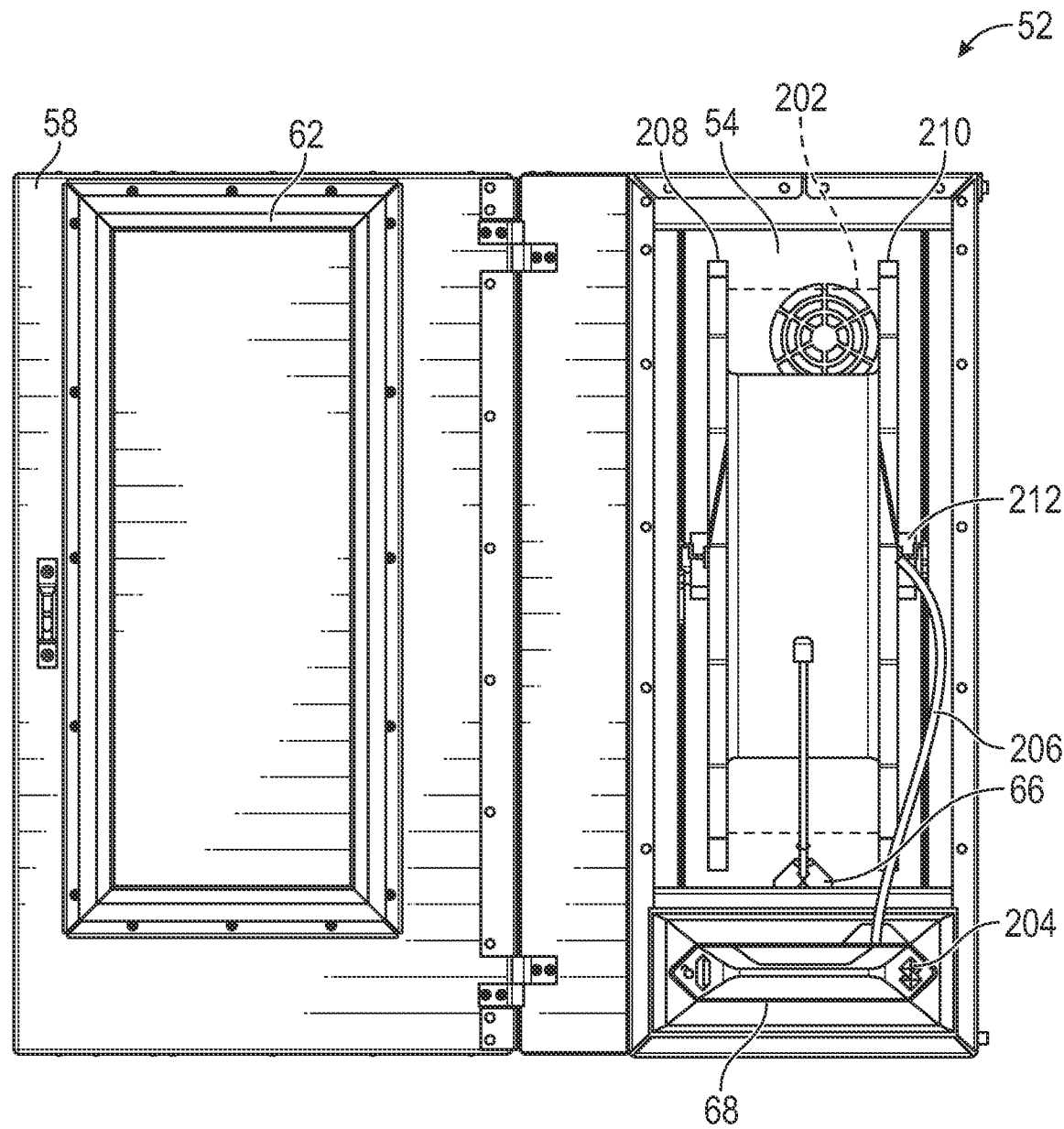

FIGS. 8-10 illustrate a process for installing a consumable assembly 12 into a spool cabinet 52 of 3D printer 10 in preparation for printing. A spool 200 of a consumable assembly, loaded with filament 202, is carried to the spool cabinet. For example, the spool is preferably carried by filament key fob 204 which is releasably secured to spool walls 208 and 210, though any method of carrying spool 200 can be used. With door 58 in the open position, the spool is loaded into chamber 54 with axle 212 positioned in axle channels 64. FIG. 8 illustrates this spool position, with filament key fob 204 still attached to spool walls 208 and 210, and with the handle coupled to axle 212 (or elsewhere on spool 200) by tether 206.

Referring now more particularly to FIG. 9, with the spool loaded into chamber 54 of the spool cabinet, a filament guide 350, which can accompany the spool 200 in the consumable assembly 12 in some embodiments, is inserted into receptacle 66 to direct the filament from the spool to a guide tube 16 (shown in FIG. 2). The filament guide 350 in the receptacle 66 provides a filament path from proximate the spool 200, through the guide tube 16, to an extruder such as a print head 18 or to the drive mechanism of a print head 18. The filament key fob 204 is detached from the spool walls, for example by unlatching the filament key fob handle using latch release mechanism 318. The filament key fob 204 maintains its connection to spool 200 through tether 206 after detachment from its carrying position on the spool walls. The filament 202 is then removed from a notch 216 in one of the spool walls, and the filament is fed into the guide 350. Filament may then be fed to the 3D printer by advancing filament from the spool along the closed filament feed path created by the filament guide 350 and the filament guide tube. Next, as best shown in FIG. 10, filament key fob 204 is inserted into dock 68 with latch insertion member 312 received into latch receiving structure 70 to secure the filament key fob handle in place. With filament key fob 204 inserted into dock 68, the connection point of tether 206 is positioned adjacent to notch 74 which allows tether 206 to extend from the dock and upward toward its connection to spool 200. Insertion of filament key fob 204 into dock 68 allows storage of the filament key fob handle in a location which is protected from the high temperatures of chamber 54 of spool cabinet 52. When closed, the door 58, gasket 62, and cabinet frame 56 contain the heat from chamber 54, allowing filament key fob 204 to remain relatively cooler. This allows the filament key fob handle to be safely removed by an operator's hand when the spool 200 is to be removed from the spool cabinet. It also provides the operator with a non-heated contact point for grabbing onto the spool in the spool cabinet. In embodiments with a memory chip or other electronic device in the handle, this also protects the device from damage which can be caused by exposure to elevated temperatures.

After insertion of filament key fob 204 into dock 68, interface 72 of the dock is used to read the data from the spool chip 306 to identify information such as the material type, quantity, required spool cabinet temperature, etc. In some 3D printers, the controller assembly 38 will not allow the filament from the spool to be used until data from the chip has been read.

When printing is completed, the filament is clipped and an end piece is inserted into a notch 216 on one of the spool walls 208 and 210, for convenient storage. The filament key fob 204 is removed from dock 68 by manipulation of latch release mechanism 318, and then reattached to perimeters of the spool walls, preferably over the filament end located in the notch 216, which holds the filament end secured in place. Using the filament key fob handle, the spool 200 can be removed from spool cabinet 52 and carried away for storage.

The above-described embodiments are illustrative of methods of handling a fused deposition modeling filament spool 200. One such exemplary method embodiment is represented in flow diagram 400 shown in FIG. 11. As discussed, the spool is transported with the spool chip or filament key fob coupled to the spool by a tether. This is represented in block 402. For example, in some embodiments, the filament spool 200 is carried by filament key fob 204 configured as a handle and secured to the spaced apart spool walls 208, 210. As discussed, in exemplary embodiments, the handle is further coupled to the spool by a tether and can include a spool chip or spool identification component electrical device. As shown at block 404, the spool is positioned in chamber 54 of the spool cabinet 52. In some embodiments including a handle, the handle is used to position the spool in chamber 54 of spool cabinet 52, with the chamber optionally being of a type which provides a heated or otherwise controlled environment for drying the filament wound on the spool. With the spool positioned in the chamber, the housing of the filament key fob (e.g., the handle) is removed from the spool, but remains coupled to the spool by the tether. This is represented at block 406 in FIG. 11. As shown at block 408, the tethered spool chip housing is positioned in a dock located outside of the controlled environment of the chamber. In some exemplary method embodiments, steps 402-408 represent a scope of the method. However, in other embodiments, further steps 410-416 are also included.

Figure 11:
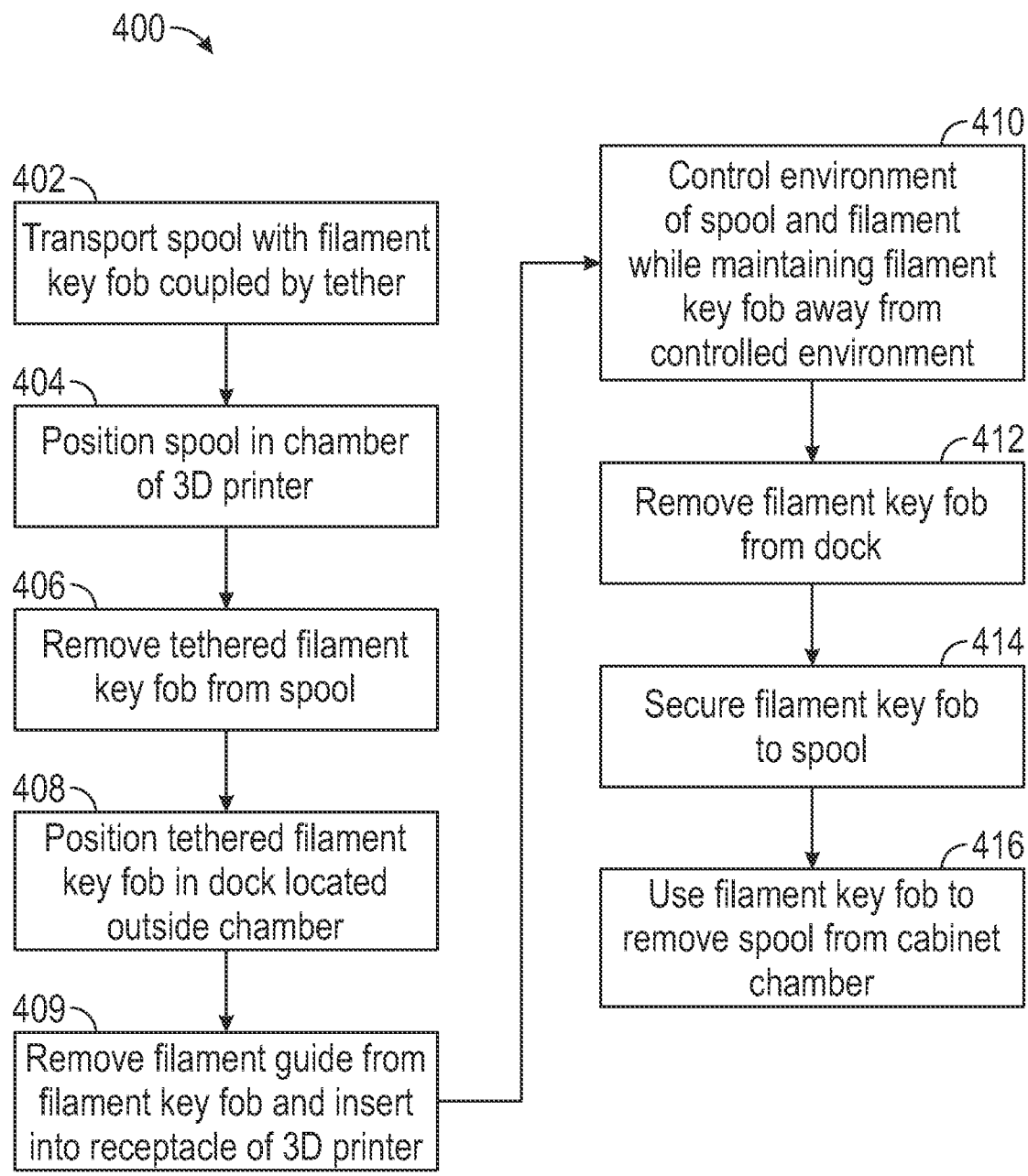
FIG. 11 is a flow diagram of representative methods, according to the process illustrated in FIGS. 8-10.

As shown at block 409 in FIG. 11, in embodiments that include the filament guide 350 with the spool 200, the user removes the filament guide 350 from the filament key fob 204 and inserts it into receptacle 66 of the printer, then feeds the loose end of the filament into the filament guide 350 to initiate delivery of the filament to the print head. Depending upon the design, removal of the filament guide will typically occur prior to positioning of the filament key fob in the dock, but this need not be the case in all embodiments. As illustrated at block 410 in FIG. 11, in some embodiments, with the spool positioned in the chamber and the handle or other filament key fob positioned in the dock, the spool and filament are heated or otherwise exposed to a controlled environment, while the handle is maintained at a lower temperature or different environment. This would for example be accomplished by closing the door of the spool cabinet and heating the spool and filament, with the tether extending between the door or door seal and the frame of the cabinet so that the handle or other spool chip housing can remain outside of the heated environment. In exemplary embodiments, the spool and filament are heated to temperatures above 50 degrees C., and typically to temperatures above 100 C, in order to ensure that the filament does not absorb moisture, but the handle or spool chip housing is maintained at a temperature below 50 degrees C.

When it is time to remove the spool from the heated environment of the chamber of the cabinet, the door is opened and the filament key fob or handle is removed from the dock as represented at block 412 in FIG. 11. As shown at block 414, in the example of a handle, the lower temperature handle is secured to the spool walls, for example using the snap fit connections discussed above. In some advantageous embodiments, with multiple filament securing notches 216 positioned around perimeter edges of spool walls 208 and 210, the handle is secured to portions of the spool walls proximate one of the notches to aid in management of the cut end of the filament. Also, in embodiments using a handle, as shown at block 416, the handle is then use to remove the spool from the cabinet. Further, the filament guide 350 can be reattached to the handle or filament key fob if desired.

Although the present disclosure may have been described with reference to preferred embodiments, workers skilled in the art will recognize that changes may be made in form and detail without departing from the spirit and scope of the disclosure.

The invention claimed is:

1. A consumable assembly for a 3D printer, the assembly comprising:
    a spool having spaced apart spool walls, a hub, a filament winding area defined by the spool walls and the hub, and filament wound on the spool in the filament winding area, the spool configured to be installed into a spool cabinet configured for maintaining the spool in a controlled environment and providing filament to a print head of the 3D printer through a filament path;
    a filament key fob comprising a spool chip retained in a spool chip housing; and
    a tether, separate from the filament path, coupling the filament key fob to the spool and configured to allow the filament key fob to reach a dock of the 3D printer located outside of the spool cabinet while the spool is installed in the spool cabinet and while the tether remains coupled to the spool and to the filament key fob.

2. The consumable assembly of claim 1, wherein the spool chip housing is configured to be removably attached to the spool for transport and storage.

3. The consumable assembly of claim 2, wherein the spool chip comprises an identification device for the consumable assembly.

4. The consumable assembly of claim 3, wherein the spool chip is configured to be received in the dock of the 3D printer to position the identification device adjacent a corresponding spool chip interface of the 3D printer.

5. The consumable assembly of claim 1, and further comprising a filament guide configured for attachment to the filament key fob during transport and storage.

6. The consumable assembly of claim 5, wherein the tether couples the spool chip housing to an axle of the spool.

7. The consumable assembly of claim 5, wherein the filament key fob further functions as a handle configured to be removably attached to the spool to allow the spool to be carried by the filament key fob for installation into the spool cabinet of the 3D printer.

8. The consumable assembly of claim 5, wherein the spool chip housing is configured to be removably attached to edges of spaced apart walls of the spool.

9. The consumable assembly of claim 8, wherein the spool chip housing includes first and second snap fit channels configured to snap-fit to the edges of the spaced apart spool walls.

10. The consumable assembly of claim 9, wherein the spool chip housing further includes a latch release mechanism configured to be manipulated to cause the spool chip housing to release from the edges of the spaced apart spool walls.

11. The consumable assembly of claim 10, wherein the latch release mechanism is also configured to function as a release mechanism for securing the spool chip housing in the dock and releasing the spool chip housing from the dock.

12. A method of handling a consumable assembly including a fused deposition modeling filament spool, the spool having spaced apart spool walls, a hub, a filament winding area defined by the spool walls and the hub, and filament wound on the spool in the filament winding area, the method comprising:
    transporting the spool, with a filament key fob coupled to the spool by a tether, to a 3D printer;
    positioning the spool in a chamber of a spool cabinet of the 3D printer, the chamber providing a controlled environment for the filament wound on the spool from which the filament is provided to a print head of the 3D printer through a filament path, the filament path separate from the tether; and
    positioning the filament key fob in a dock of the 3D printer while the tether couples the filament key fob to the spool, the dock located outside of the chamber, to allow the 3D printer to utilize the filament wound on the spool.

13. The method of claim 12, wherein the filament key fob is a spool identification component, and wherein when the filament key fob is received in the dock of the 3D printer a spool chip is positioned adjacent a corresponding spool chip interface of the 3D printer.

14. The method of claim 13, wherein the chamber provides a heated environment for the filament wound on the spool, and wherein positioning the filament key fob in the dock located outside of the chamber maintains the spool chip at a temperature lower than the temperature of the heated environment.

15. The method of claim 14, and further comprising closing a door of the spool cabinet and heating the spool and filament to a temperature above 50 degrees C., while maintaining the filament key fob at a temperature below 50 degrees C.

16. The method of claim 13, wherein the filament key fob comprises a handle attached to the spaced apart spool walls and separately coupled to the spool by the tether, wherein positioning the spool in the chamber of the spool cabinet of the 3D printer includes positioning the spool using the handle, and wherein positioning the filament key fob in the dock of the 3D printer includes positioning the handle in the dock of the 3D printer.

17. The method of claim 16, and further comprising removing the handle from the spaced apart spool walls while the spool is positioned in the chamber and while the handle remains separately coupled to the spool by the tether.

18. The method of claim 16, wherein transporting the spool includes carrying the spool by the handle.

19. The method of claim 16, and further comprising:
    removing the handle from the dock;
    securing the handle to the spool while the handle remains separately coupled to the spool by the tether; and
    using the handle to remove the spool from the chamber of the spool cabinet.

20. The method of claim 19, wherein securing the handle to the spool further comprises securing the handle to the spaced apart spool walls proximate one of a plurality of notches in the spool walls, the notches and handle configured to secure an end portion of the filament to a spool wall.

21. The method of claim 19, wherein the handle includes first and second snap fit channels configured to snap-fit to the edges of the spaced apart spool walls, wherein the handle further includes a latch release mechanism configured to be manipulated to cause the handle to release from the edges of the spaced apart spool walls, wherein removing the handle from the dock further comprises using the latch release mechanism to release the handle from the dock.

22. The method of claim 12, and further comprising removing a filament guide from the filament key fob and inserting the filament guide into a receptable of the 3D printer to provide a filament path from proximate the spool, through a guide tube, to proximate the print head.

* * * * *